United States Patent [19]

Satake et al.

[11] Patent Number: 5,650,459
[45] Date of Patent: Jul. 22, 1997

[54] POLY (ARYLENE SULFIDE) RESIN COMPOSITION

[75] Inventors: Yoshikatsu Satake; Toshihiko Ono, both of Iwaki, Japan

[73] Assignee: Kureha Kagaku Kogyo K.K., Tokyo, Japan

[21] Appl. No.: 397,015

[22] Filed: Mar. 1, 1995

Related U.S. Application Data

[63] Continuation of Ser. No. 168,310, Dec. 17, 1993, abandoned.

[30] Foreign Application Priority Data

Dec. 24, 1992 [JP] Japan ................. 4-357661

[51] Int. Cl.⁶ ................. C08K 5/09; C08K 3/22
[52] U.S. Cl. ............ 524/396; 524/398; 524/424; 524/435; 524/609
[58] Field of Search ................. 524/396, 398, 524/424, 435, 609

[56] References Cited

U.S. PATENT DOCUMENTS

| | | | |
|---|---|---|---|
| 4,017,450 | 4/1977 | Bailey | 525/537 |
| 4,115,344 | 9/1978 | Brady . | |
| 4,178,276 | 12/1979 | Shue et al. | 524/394 |
| 4,212,793 | 7/1980 | Shue | 524/405 |
| 4,214,021 | 7/1980 | Blackwell | 428/419 |
| 4,237,039 | 12/1980 | Blackwell | 525/537 |
| 4,585,700 | 4/1986 | Johnson et al. | 428/419 |
| 4,746,698 | 5/1988 | Kouyama et al. | 524/609 |
| 5,108,823 | 4/1992 | Sirinyan et al. | 428/209 |
| 5,120,808 | 6/1992 | Satake et al. . | |
| 5,149,581 | 9/1992 | Matsuo et al. | 428/224 |
| 5,169,892 | 12/1992 | Kawashima et al. | 524/394 |
| 5,177,137 | 1/1993 | Kawashima et al. | 524/413 |
| 5,248,743 | 9/1993 | Satake et al. . | |
| 5,256,715 | 10/1993 | Harry | 524/188 |
| 5,300,552 | 4/1994 | Hindi et al. | 524/494 |

FOREIGN PATENT DOCUMENTS

| | | |
|---|---|---|
| 0040912 | 12/1981 | European Pat. Off. . |
| 0221567 | 5/1987 | European Pat. Off. . |
| 0459619-A2 | 12/1991 | European Pat. Off. . |
| 0459621-A2 | 12/1991 | European Pat. Off. . |
| 57-205445 | 12/1982 | Japan . |
| 60-186561 | 9/1985 | Japan . |
| 61-14228 | 1/1986 | Japan . |
| 62-27434 | 2/1987 | Japan . |
| 62-109850 | 5/1987 | Japan . |
| 62-115030 | 5/1987 | Japan . |
| 62-241962 | 10/1987 | Japan . |
| 62-295955 | 12/1987 | Japan . |
| 63-45711 | 9/1988 | Japan . |
| 2-36264 | 2/1990 | Japan . |
| 2-82095 | 3/1990 | Japan . |
| 2-101396 | 4/1990 | Japan . |
| 2-105857 | 4/1990 | Japan . |
| 2-196858 | 8/1990 | Japan . |
| 2-218754 | 8/1990 | Japan . |
| 2-225527 | 9/1990 | Japan . |
| 3-143958 | 6/1991 | Japan . |
| 3-223332 | 10/1991 | Japan . |
| 4-100826 | 4/1992 | Japan . |
| 4-161457 | 6/1992 | Japan . |
| 4-164961 | 6/1992 | Japan . |

*Primary Examiner*—Helen Lee
*Attorney, Agent, or Firm*—Lowe, Price, LeBlanc & Becker

[57] ABSTRACT

A poly(arylene sulfide) resin composition comprising in admixture a poly(arylene sulfide) resin and at least one nickel compound selected from the group consisting of (a) nickel carbonates, (b) nickel hydroxide, (c) organic carboxylates of nickel and (d) nickel oxide is provided. According to the resin composition of the invention, the metal corrosiveness of the poly(arylene sulfide) resin upon and after its molding or forming is sufficiently inhibited without deteriorating the excellent heat resistance, mechanical properties, processability and the like inherent in the resin.

7 Claims, No Drawings

POLY (ARYLENE SULFIDE) RESIN COMPOSITION

This application is a continuation of application Ser. No. 08/168,310 filed Dec. 17, 1993, now abandoned.

FIELD OF THE INVENTION

The present invention relates to a poly(arylene sulfide) resin composition in which the tendency of a poly(arylene sulfide) resin to cause metals making up molds, processing machinery, metal parts of inserts and the like to corrode (hereinafter may called "metal corrosiveness") has been inhibited, and more specifically to a poly(arylene sulfide) resin composition showing little tendency to cause metal corrosion and having good mechanical properties and processability.

BACKGROUND OF THE INVENTION

Poly(arylene sulfide) resins (hereinafter abbreviated as "PAS resins") such as poly(phenylene sulfide), poly (phenylene ketone sulfide) and poly(phenylene sulfone sulfide), which have both arylene groups and sulfide groups in their molecules, are engineering plastics excellent in heat resistance, mechanical properties, chemical resistance, flame resistance, electrical properties, molding and processing ability, and the like, and used in wide fields such as electrical and electronic equipments and parts, automotive equipments and parts, and chemical equipments and parts.

The PAS resins however tend to form corrosive gases such as sulfur dioxide and hydrochloric acid when heated to an elevated temperature, and hence involve problems that metallic portions of processing machines, molds and the like are corroded upon their molding and processing, or metal contacts, metal parts of inserts and the like in molded products are corroded. For example, the usual processing machine is made of an iron-based material and hence tends to suffer from chemical corrosion when coming into contact with a PAS resin melted upon its molding. On the other hand, the molded products thereof also become liable to color. The corrosion of a mold causes a great economical loss because the mold is expensive, and moreover makes it difficult to precisely mold. The corrosion of a metal contact in a relay making use of a PAS resin as a base polymer auses a contact failure. The corrosion of a metal part of an insert works out the degradation of solderability at the metal part of the insert. When a PAS resin, which tends to produce a corrosive gas, is used as a sealant for an electronic part, the reliability of the electronic part is lowered.

In order to solve such corrosive problems involved in the PAS resins, it has been proposed to blend various kinds of corrosion inhibitors.

There have been proposed, as corrosion inhibitors for various PAS resins, for example, the hydroxides or carbonates of alkali metals (U.S. Pat. No. 4,017,450), hydrotalcite (Japanese Patent Application Laid-Open Nos. 186561/1985 and 218754/1990), the oxalates of metals selected from Groups IA, IIA and IIB of the periodic table (U.S. Pat. No. 4,178,276), γ-alumina (Japanese Patent Application Laid-Open No. 241962/1987), zinc oxide (Japanese Patent Publication No. 45711/1988 and Japanese Patent Application Laid-Open No. 164961/1992), the hydroxides or oxides, or aromatic carboxylates of Group IIA metals of the periodic table, or aromatic carboxylates of Group IA metals of the periodic table (Japanese Patent Application Laid-Open No. 109850/1987), metal aluminates (Japanese Patent Application Laid-Open No. 295955/1987), zinc carbonate and/or zinc hydroxide (Japanese Patent Application Laid-Open No. 105857/1990), lithium sulfite (Japanese Patent Application Laid-Open No. 36264/1990), at least one element selected from zinc, lead, magnesium, manganese, barium and tin (Japanese Patent Application Laid-Open No. 205445/1982), the phosphates of Group IIB metals of the periodic table (Japanese Patent Application Laid-Open No. 161457/1992), the metaborates or tetraborates of Group IA or IIA metals of the periodic table, and the like (U.S. Pat. No. 4,212,793), ammonia precursors such as urea (U.S. Pat. No. 4,115,344), sodium nitrite (U.S. Pat. No. 4,214,021), alkali metal arylalkanates (U.S. Pat. No. 4,237,039), and calcium carbonate (Japanese Patent Application Laid-Open Nos. 196858/1990 and 143958/1991).

However, the conventionally-known corrosion inhibitors involve, for example, the following drawbacks. The corrosion-inhibiting effect is insufficient (calcium carbonate, γ-alumina, zinc oxide, sodium oxalate, etc.); the mechanical strength of the PAS resin is deteriorated (zinc oxide, zinc carbonate, γ-alumina, etc.); and although they have a good corrosion-inhibiting effect, the melt-flow characteristics and/or crystallization properties of the PAS resin are lowered in that the melt viscosity of the PAS resin is increased to a significant extent and/or its crystallization speed is reduced to a great extent, and hence its processability is deteriorated (the hydroxides or oxides of Group IIA metals of the periodic table, sodium citrate, metal aluminates, sodium carbonate, lithium carbonate. There has not been provided under the circumstances any corrosion inhibitor which can fully satisfy in practical use.

OBJECTS AND SUMMARY OF THE INVENTION

It is an object of the present invention to provide a PAS resin composition in which the metal corrosiveness of a PAS resin upon and after its molding or forming has been fully inhibited without deteriorating the excellent heat resistance, mechanical properties, processability and the like inherent in the PAS resin.

The present inventors have carried out an extensive investigation with a view toward overcoming the above-described problems involved in the prior art. As a result, it has been found that specific nickel compounds impart an excellent corrosion-inhibiting effect to PAS resins and moreover exhibit excellent properties as a corrosion inhibitor without impairing the melt-flow characteristics, crystallization properties and mechanical properties of the PAS resins. The present invention has been led to completion on the basis of this finding.

According to the present invention, there is thus provided a poly(arylene sulfide) resin composition comprising in admixture a poly(arylene sulfide) resin and at least one nickel compound selected from the group consisting of:

(a) nickel carbonates,
(b) nickel hydroxide,
(c) organic carboxylates of nickel, and
(d) nickel oxide.

The features of the PAS resin composition according to the present invention resides in first that the generation of corrosive gases upon melt molding of the PAS resin can be effectively suppressed, thereby reducing the corrosion of processing machines and molds, and of metal contacts and metal parts of inserts to a great extent, second that it exhibits excellent flow characteristics upon its melting, third that it exhibits excellent crystallization properties, and fourth that it provides molded products excellent in mechanical strength.

As described above, the conventional corrosion inhibitors have been such that the effect of inhibiting the generation of the corrosive gases is insufficient, that the mechanical strength is deteriorated, or that although the corrosion-inhibiting effect is excellent, the melt viscosity is increased to a great extent and/or the melt crystallization temperature is lowered to a significant extent, and hence the processability is deteriorated notably. On the contrary, the PAS resin composition according to the present invention is well balanced between reduced corrosiveness, and processability, mechanical properties and the like.

DETAILED DESCRIPTION OF THE INVENTION

The features of the present invention will hereinafter be described in detail.

PAS resin:

The PAS resin useful in the practice of the present invention is an aromatic polymer having predominant recurring units represented by the formula —(Ar—S)— in which Ar means an arylene group, and containing arylene groups and sulfide groups.

As exemplary arylene groups, may be mentioned a p-phenylene group, a m-phenylene group, substituted phenylene groups (the substituent being an alkyl group, preferably an alkyl group having 1–5 carbon atoms or a phenyl group), a p,p'-diphenylene sulfone group, a p,p'-biphenylene group, p,p'-diphenylenether group, a p,p'-diphenylenecarbonyl group, a naphthylene group, etc.

Among PAS resins containing the above-mentioned arylene groups, polymers predominantly having only the same arylene groups may preferably be used. However, copolymers having two or more different arylene groups may be used from the viewpoint of processability and heat resistance.

As a PAS resin used in the present invention, a poly(p-phenylene sulfide) resin (PPS resin) having predominant recurring units (including at least 50 wt. % of the recurring units) of p-phenylene sulfide represented by the chemical formula

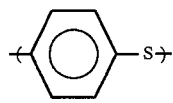

is particularly preferred because it is excellent in processability and industrially available with ease.

As examples of other PAS resins used in the present invention, may be mentioned poly(arylene ketone sulfide) resins (PKS resins) having predominant recurring units (including at least 50 wt. % of the recurring units) of arylene ketone sulfide represented by the general formula

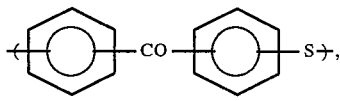

and poly(arylene ketone ketone sulfide) resins (PKKS resins) having predominant recurring units (including at least 50 wt. % of the recurring units) of arylene ketone ketone sulfide represented by the general formula

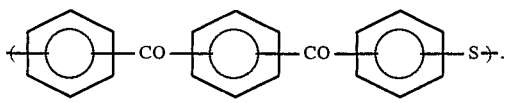

As preferable examples of other PAS resins used in the present invention, may be mentioned poly(arylene sulfone sulfide) resins (PSS resins) having predominant recurring units (including at least 50 wt. % of the recurring units) of arylene sulfone sulfide represented by the general formula

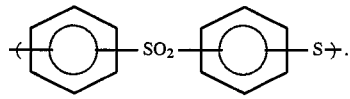

When the PAS resin used in the present invention is a copolymer, a copolymer containing p-phenylene sulfide recurring units and m-phenylene sulfide recurring units is preferred, with a block copolymer having respective blocks of these recurring units (as described, for example, in Japanese Patent Application Laid-Open No. 14228/1986) being particularly preferred.

As preferable examples of other copolymer-type PAS resins, may be mentioned copolymers having phenylene sulfide recurring units and arylene ketone sulfide recurring units, copolymers having phenylene sulfide recurring units and arylene ketone ketone sulfide recurring units, copolymers having phenylene sulfide recurring units and arylene sulfone sulfide recurring units, copolymers having arylene ketone sulfide recurring units and arylene sulfone sulfide recurring units, and copolymers having arylene ketone ketone sulfide recurring units and arylene sulfone sulfide recurring units. These copolymers may be block copolymers (as described, for example, in Japanese Patent Application Laid-Open Nos. 225527/1990 and 223332/1991, EP-0459619-A2, EP-0459621-A2, and Japanese Patent Application Laid-Open Nos. 115030/1987, 27434/1987 and 100826/1992).

Of these PAS resins, crystalline polymers may be particularly preferably used because they are excellent in processability, heat resistance and the like. These PAS resins may be used either singly or in any combination thereof.

Nickel compounds:

Compounding agents used in the present invention and adapted to inhibit corrosion and improve melt-flow characteristics and crystallization properties are organic carboxylates of nickel, nickel carbonates, nickel hydroxide and nickel oxide. Of these, organic carboxylates of nickel, nickel carbonates and nickel hydroxide are preferred.

As examples of the organic carboxylates of nickel useful in the practice of this invention, may be mentioned nickel citrate, nickel oxalate, nickel acetate, nickel benzoate, nickel stearate and nickel palmitate. Nickel polycarboxylates, in particular, nickel citrate and nickel oxalate, which are dicarboxylates or tricarboxylates, may preferably be used from the viewpoint of heat stability at an elevated temperature.

As examples of the nickel carbonates useful in the practice of this invention, may be mentioned a normal carbonate and a basic carbonate. The basic carbonate (nickel hydroxy carbonate) is particularly preferred from the viewpoint of effects and industrial availability.

Some of these nickel compounds are available in the form of a hydrate. The hydrates of these nickel compounds may be used as they are, or after they are dehydrated.

It is preferable from the viewpoint of enhancing the corrosion-inhibiting effect that these nickel compounds should be evenly dispersed in the form of fine particles so as to make the contact area with the PAS resin as great as possible. Particles having a fine particle size may be prepared with ease by a known grinding and classifying technique.

These nickel compounds may be used either singly or in any combination thereof. The proportion of the nickel compounds to be mixed is within a range of generally 0.01–10 parts by weight, preferably 0.01–5 parts by weight per 100 parts by weight of the PAS resin. Proportions lower than 0.01 part by weight are too low to sufficiently exhibit the corrosion-inhibiting effect. On the contrary, proportions exceeding 10 parts by weight might adversely affect the mechanical properties, flowability and the like of the PAS resin.

PAS resin composition:

With respect to the PAS resin compositions according to the present invention, the metal corrosiveness is greatly inhibited compared with the case of a PAS resin alone. In addition, since the PAS resin compositions of the present invention do not very undergo increase in melt viscosity and lowering of crystallization temperature, they have good processability and excellent mechanical properties.

(1) Metal corrosiveness:

The first feature of the PAS resin compositions according to the present invention resides in that the metal corrosiveness inherent in the PAS resin is remarkably inhibited. The metal corrosiveness of the PAS resin or PAS resin compositions can be evaluated in accordance with the following testing method:

<Testing method of corrosiveness>

A glass-made test tube having an external diameter of 21 mm and a length of 200 mm was charged with 4 g of a PAS resin or a PAS resin composition containing 4 g of the PAS resin in the form of powder (which passes through a screen having an opening size of 355 µm, i.e., a 42-mesh screen and is captured on a screen having an opening size of 150 µm, i.e., a 100-mesh screen). A stainless steel foil, SUS 304H (thickness: 50 µm, width: 18 mm, length: 160 mm) as a specimen for corrosion test is then placed in the test tube which is then closed with an open cell sponge stopper made of silicone rubber. Using a block bath (SSC-9100, manufactured by Senshu Kagaku K.K.), the test tube is heated for 3 hours at 280° C. After the heating treatment, the test tube is left over for about 12 hours at room temperature. Thereafter, the corroded condition of the specimen is visually observed.

Standard for Judging Metal Corrosiveness:

A: A particularly remarkable effect was recognized;

B: A remarkable effect was recognized;

C: An effect was recognized; and

D: No effect was recognized.

(2) Crystallization properties:

The second feature of the PAS resin compositions according to the present invention resides in that when a crystalline PAS resin is used, the PAS resin compositions can retain the excellent crystallization properties inherent in the PAS resin.

Among the crystallization properties, the easiness of crystallization is a chief factor in the determination of solidification speed in injection molding and the like and greatly affects productivity. The easiness of crystallization also greatly affects crystallinity which controls mechanical properties such as heat resistance and modulus of elasticity. Therefore, it is not preferable that the crystallization properties of the crystalline PAS resin is impaired due to the addition of a corrosion inhibitor in a small amount. The crystallization properties of the PAS resin can be evaluated by its melt crystallization temperature. More specifically, the inhibitory degree of crystallization can be evaluated by the following method.

<Evaluation method>

The melt crystallization temperature of each sample is measured by means of a differential scanning calorimeter at a cooling rate of 10° C./min after about 10 mg of the sample are heated to 340° C. in an inert gas atmosphere, and held for 1 minute at the same temperature. An inhibitory degree of crystallization, $\Delta(Tmc)$ can be expressed by the following equation:

$$\Delta(Tmc) = [(Tmc)_0 - (Tmc)]/(Tmc)_0 \times 100$$

wherein $(Tmc)_0$ is a melt crystallization temperature of a PAS resin alone and $(Tmc)$ is a melt crystallization temperature of a composition obtained by adding a corrosion inhibitor to the PAS resin.

The inhibitory degree of crystallization becomes smaller as the $\Delta(Tmc)$ value decreases. It is preferable that the inhibitory degree of crystallization should be as small as possible. In the PAS resin compositions according to the present invention, this value is generally 15 or smaller, preferably 14 or smaller, more preferably 13 or smaller. The range of the $\Delta(Tmc)$ value not greater than 15 includes minus values which mean that the melt crystallization temperature has been raised. Values exceeding 15 are not preferred because such values mean that the crystallization speed has become very low.

(3) Flow characteristics:

The third feature of the PAS resin compositions according to the present invention resides in that the flow characteristics are stable (constant). In thin-wall molding or precision molding, a resin is particularly required to have high flowability upon its melt processing. Even in common molding and processing, it is not preferable that flow characteristics are changed greatly due to the addition of a corrosion inhibitor in a small amount because the determination of optimum conditions for molding becomes difficult. The constancy of the flow characteristics can be evaluated in the following manner.

<Evaluation method of constancy of flow characteristics>

Using a "Capirograph" (manufactured by Toyo Seiki Seisaku-Sho, Ltd.) the melt viscosity, $\eta^*_0$ (shear rate: 1200/sec) of a PAS resin and the melt viscosity, $\eta^*$ (shear rate: 1200/sec) of a PAS resin composition containing the PAS resin and a corrosion inhibitor are measured to express the constancy in terms of a ratio, $\eta^*/\eta^*_0$ of $\eta^*$ to $\eta^*_0$. Values obtained by presetting the measuring temperature to 310° C. and measuring the respective melt viscosities by means of a capillary having an internal diameter of 1 mm and an L/D of 10/1 after preheating their corresponding samples at 310° C. for 5 minutes are regarded as measurements.

The ratios, $\eta^*/\eta^*_0$ of the PAS resins composition according to the present invention are generally 0.5–1.6, preferably 0.6–1.5, more preferably 0.7–1.4. PAS resin compositions having either $\eta^*/\eta^*_0$ ratio higher than 1.6 or lower than 0.5 are not preferred because the flowability of the resin compositions becomes greatly varied due to the addition of the corrosion inhibitor.

It is preferable that at least one nickel compound selected from the group consisting of (a) through (d), namely, the corrosion inhibitor useful in the practice of the present invention, should be mixed with a PAS resin as evenly as possible. As a mixing method, may be used a variety of known methods. For example, the predetermined corrosion inhibitor may be added to the PAS resin to dry-blend them by a mixer or tumbler. Alternatively, the corrosion inhibitor in the form of an aqueous solution, organic solvent solution or slurry may be added to the PAS resin to blend them, followed by drying of the resulting blend. A mixture may be charged into a single- or twin-screw extrusion kneader or the like to melt and knead it at 260°–450° C. A PAS resin composition containing the corrosion inhibitor in a high concentration may be prepared in advance to use the composition as a masterbatch which is then diluted with the PAS resin to give a predetermined proportion.

A various kinds of fillers may be added to the PAS resin compositions according to the present invention as needed. The fillers are generally incorporated for a purpose of improving mechanical strength, heat resistance, dimensional stability, electrical properties, etc. The fillers are selected from inorganic and organic compounds and used in the form of fibers, plates, powder or hollows as necessary for the end application intended.

As exemplary fibrous fillers, may be mentioned glass fibers, carbon fibers, Aramid fibers, boron fibers, potassium titanate fibers, silica fibers, silica-alumina fibers, asbestos fibers, zirconia fibers, boron nitride fibers, silicon nitride fibers, silicon carbide fibers, stainless steel fibers, alumina fibers and the like.

As exemplary platy or powdery fillers, may be mentioned metal oxides such as silica, diatomaceous earth, alumina, titanium oxide, iron oxides, zinc oxide and magnesium oxide; metal hydroxides such as aluminum hydroxide, magnesium hydroxide and basic magnesium carbonate; metal carbonates such as calcium carbonate, magnesium carbonate and dolomite; metal sulfates or sulfites such as calcium sulfate, barium sulfate and calcium sulfite; silicates such as talc, clay, mica, asbestos, glass beads, calcium silicate, montmorillonite, bentonite and kaolin; metals such as iron, lead and aluminum; and other fillers such as lead titanate and lead zirconate.

As exemplary hollow fillers, may be mentioned glass balloons, pumice balloons and hollow silica and the like.

These fillers may be use either singly or in any combination thereof. Although the proportion of the fillers to be blended may vary with the end application intended, it is generally not higher than 400 parts by weight, preferably not higher than 250 parts by weight per 100 parts by weight of the resin component in the PAS resin composition. If the proportion is too high, the molding and processing ability and toughness of the resulting resin composition are impaired. It is hence not preferable to blend the fillers in such a high proportion.

The PAS resin compositions according to the present invention may contain at least one filler having a functionality-imparting effect. Typical examples thereof include magnetic powders, for example, ferrite magnetic powders represented by $MO.6Fe_2O_3$ (M: at least one of Ba, Sr, Ca, Mg, Zn and Pb), rare earth cobalt magnetic powders of $RCO_5$ or $R_2CO_{17}$ (R: at least one of rare earth elements such as Sm, Pr, Oe and La), alnico magnetic powder, manganese.bismuth magnetic powder, manganese.zinc ferrite magnetic powder, manganese.magnesium.ferrite magnetic powder and nickel.zinc magnetic powder.

The proportion of these magnetic powders to be blended is generally not higher than 1600 parts by weight, preferably 200–1200 parts by weight per 100 parts by weight of the resin component in the PAS resin composition. Proportions of the magnetic powder exceeding 1600 parts by weight result in a resin composition deteriorated in moldability and lowered in magnetic properties. On the other hand, too low proportions result in a resin composition having insufficient magnetic properties.

The PAS resin compositions according to the present invention may be mixed with at least one of other thermoplastic resins and thermosetting resins compatible with the PAS resin within limits not impeding the object of the present invention. As specific examples thereof, may be mentioned aromatic polyether ketones such as poly(ether ether ketones) (PEEKs) and poly(ether ketones) (PEKs), polyesters (including aromatic polyesters, liquid crystalline polyesters and polyarylates), polyamides (including Aramids), aromatic polysulfones such as polysulfones and polyether sulfones, polyether imides, polyamide imides, polyphenylene ethers, modified polyphenylene ethers, ABS resins, polycarbonate, polyacetal, polybutylene terephthalate, polyethylene terephthalate, fluororesins, epoxy resins, silicone resins, polyimide, etc.

The PAS resin compositions may be mixed with at least one elastomer for the purpose of improving the impact resistance of the PAS resin. As examples thereof, may be mentioned polyolefinic copolymers including olefinic copolymers containing epoxy groups, or acid or acid anhydride groups in their side chains or principal chains, diene elastomers, polystyrene elastomers, polyamide elastomers, polyester elastomers, polyurethane elastomers, fluorine-containing elastomers, silicone elastomers, polysulfide elastomers, acrylic copolymers and their salts with metals such as Na, Zn, K, Ca and Mg, organosiloxane rubber, and the like.

The resin components such as the thermoplastic resins, thermosetting resins and elastomers may be incorporated either singly or in any combination thereof in a proportion of generally 0–400 parts by weight, preferably 0–200 parts by weight, more preferably 0–100 parts by weight per 100 parts by weight of the PAS resin. If the proportion of the resin component exceeds 400 parts by weight, there is a potential problem that the excellent heat resistance, chemical resistance, molding and processing ability and the like inherent in the PAS resin could be impaired substantially in the resulting resin composition.

The PAS resin compositions according to the present invention may also be added suitably with various additives such as antioxidants, stabilizers, lubricants, mold-releasing agents, pigments and/or silane coupling agents as needed. The conventionally-known corrosion inhibitors may also be added within limits not impeding the object of the present invention. In particular, specific zinc compounds (Japanese Patent Application Laid-Open No. 164961/1992) and zinc carbonate and zinc hydroxide (Japanese Patent Application Laid-Open No. 105857/1990), and the like, which are said to have an effect of inhibiting silver corrosion, may preferably be used.

The PAS resin compositions of the present invention can be used as molding or forming materials and coating materials. The PAS resin compositions of the present invention are molded or formed by injection molding, extrusion, vacuum forming, compression molding or the like. The occurrence of metal corrosion in the forming or molding equipments upon their pelletizing, or molding or forming by the above molding or forming methods is however inhibited. In addition, molded or formed products in which corrosion products such as rust are prevented from being mixed therein can be provided.

The PAS resin compositions according to the present invention are useful as molding or forming compositions, in particular, for molded or formed products used in combination with metal, or for outsert molding or insert molding.

ADVANTAGES OF THE INVENTION

The PAS resin compositions according to the present invention have the following advantageous effects:

(1) since they are resin compositions in which the corrosiveness of the PAS resin has been reduced to a great extent, the corrosion of metal parts such as a cylinder and a mold is lessened, thereby permitting their economical and efficient processing;

(2) since the corrosiveness of the PAS resin is reduced and improved to a great extent without impairing the excellent flow characteristics and crystallization properties inherent in the PAS resin, their application fields can be widened;

(3) the corrosiveness of the PAS resin is reduced and improved to a great extent without impairing the excellent mechanical properties inherent in the PAS resin; and (4) since they scarcely corrode metal, they are suitable for use in molded or formed products combined with a metal, or as resin compositions for outsert molding or insert molding.

EMBODIMENTS OF THE INVENTION

The present invention will hereinafter be described more specifically by the following examples and comparative examples. It should however be borne in mind that the present invention is not limited to the following examples only.

Example 1 and Comparative Example 1:

Various metallic compounds shown in Table 1 were separately added to 100 parts by weight of poly(p-phenylene sulfide) resin (PPS resin, "FORTRON KPS W205", product of Kureha Chemical Industry Co., Ltd.) as a PAS resin in their corresponding proportions shown in Table 1 to blend the respective mixtures by hand. Each of the resultant blends was kneaded in a single-screw extruder at a cylinder temperature of 310° C. to obtain an extrudate of a resin composition. This extrudate was ground and sifted by a screen to prepare a sample having a fixed particle size which passed through a 42-mesh screen, but was captured on a 100-mesh screen.

The results of the corrosion test are shown in Table 1. As apparent from the results shown in Table 1, the PAS resin compositions according to the present invention show little tendency to cause corrosion, and are also small in rate of change in melt viscosity and dependence on amounts added, and hence excellent in flow characteristics. Even with respect to the crystallization speed, they are extremely characteristically found to substantially retain the crystallization speed of the PAS resin. On the contrary, it is understood that the known corrosion inhibitors such as calcium hydroxide, sodium carbonate and sodium aluminate each have a good corrosion-inhibiting effect, but change the melt viscosity and crystallization speed of the PAS resin to a great extent.

TABLE 1

| | Additive | | | | | |
|---|---|---|---|---|---|---|
| | Kind | Amount added (part) | Corrosion-inhibiting effect | $\eta^*/\eta^*$ O | $\Delta$(Tmc) | Tmc (°C.) |
| Ex. 1-1 | Nickel carbonate | 0.1 | A | 1.2 | 0.2 | 254.3 |
| Ex. 1-2 | Nickel carbonate | 0.3 | A | 1.3 | 0.6 | 253.3 |
| Ex. 1-3 | Nickel carbonate | 0.5 | A | 1.3 | 1.5 | 250.8 |
| Ex. 1-4 | Nickel carbonate | 1.0 | A | 1.3 | 2.2 | 249.2 |
| Ex. 1-5 | Nickel hydroxide | 1.0 | A | 1.1 | 5.0 | 242.0 |
| Ex. 1-6 | Nickel citrate | 0.1 | A | — | -0.2 | 255.2 |
| Ex. 1-7 | Nickel citrate | 0.3 | A | 1.2 | -0.3 | 255.5 |
| Ex. 1-8 | Nickel citrate | 0.5 | A | — | -0.3 | 255.4 |
| Ex. 1-9 | Nickel citrate | 1.0 | A | 1.1 | 0.0 | 254.6 |
| Ex. 1-10 | Nickel oxalate | 1.0 | A | 1.0 | 0.7 | 253.0 |
| Ex. 1-11 | Nickel stearate | 1.0 | C | 0.9 | 4.1 | 244.2 |
| Ex. 1-12 | Nickel oxide | 1.0 | C | — | 0.4 | 253.7 |
| Comp. Ex. 1-1 | Not added | — | — | — | — | 254.7 |
| Comp. Ex. 1-2 | Calcium hydroxide | 1.0 | A | 2.2 | 17.7 | 209.6 |
| Comp. Ex. 1-3 | Sodium carbonate | 1.0 | B | 1.8 | 15.9 | 214.1 |
| Comp. Ex. 1-4 | Sodium aluminate | 1.0 | A | 1.7 | 14.3 | 218.2 |

(Note)

The details of the metallic compounds shown in Table 1 are as follows. The amounts added are values converted according to purity.

(1) Nickel carbonate: basic nickel carbonate [approximate composition: $NiCO_3 \cdot 2Ni(OH)_2 \cdot 4H_2O$ (product of Wako Pure Chemical Industries, Ltd.)

(2) Nickel hydroxide: $Ni(OH)_2$ (product of NACALAI TESQUE INC.)

(3) Nickel citrate: $Ni_3(C_6H_5O_7) \cdot 14H_2O$ (product of Kanto Chemical Co., Inc.)

(4) Nickel oxalate: $NiC_2O_4 \cdot 2H_2O$ (product of NACALAI TESQUE INC.)

(5) Nickel stearate: $Ni(C_{18}H_{35}O_2)_2$ (product of NACALAI TESQUE INC.)

(6) Nickel oxide: NiO (product of Wako Pure Chemical Industries, Ltd.)

(7) Calcium hydroxide: $Ca(OH)_2$ (product of Kanto Chemical Co., Inc.)

(8) Sodium carbonate: $Na_2CO_3$ (product of Kanto Chemical Co., Inc.)

(9) Sodium aluminate: $NaAlO_2$ (product of Wako Pure Chemical Industries, Ltd.)

We claim:

1. A poly(arylene sulfide) resin composition comprising in admixture a poly(arylene sulfide) resin and, as a corrosion inhibitor, at least one metal compound wherein the metal compound consists of nickel and the compound is selected from the group consisting of:

(a) nickel carbonates, (b) nickel hydroxide, (c) nickel citrate, and (d) nickel oxalate, said corrosion inhibitor being mixed with in a proportion of about 0.01 to about 5 parts by weight per 100 parts by weight of the poly(arylene sulfide) resin.

2. The composition according to claim 1, wherein the nickel compound is mixed in a proportion of 0.01–10 parts by weight per 100 parts by weight of the poly(arylene sulfide) resin.

3. The composition according to claim 1, wherein the nickel carbonate is basic nickel carbonate.

4. The composition according to claim 1, wherein the organic carboxylate is nickel citrate, nickel oxalate, nickel acetate, nickel benzoate, nickel stearate or nickel palmitate.

5. The composition according to claim 1, wherein the poly(arylene sulfide) resin is a poly(p-phenylene sulfide) resin.

6. The composition according to claim 1, wherein an inhibitory degree of crystallization, $\Delta(Tmc)$ expressed by the following equation:

$$\Delta(Tmc)=[(Tmc)_0-(Tmc)]/(Tmc)_0\times100$$

is 15 or smaller, wherein $(Tmc)_0$ is a melt crystallization temperature of the poly(arylene sulfide) resin alone and (Tmc) is a melt crystallization temperature of the resin composition comprising the poly(arylene sulfide) resin and said at least one nickel compound, and each of the melt crystallization temperatures is a melt crystallization temperature determined by means of a differential scanning calorimeter at a cooling rate of 10° C./min after about 10 mg of a sample are heated to 340° C. in an inert gas atmosphere, and held for 1 minute at the same temperature.

7. The composition according to claim 1, wherein a ratio, $\eta^*/\eta^*_0$ of the melt viscosity, $\eta^*$ measured of a shear rate of 1200/sec) of the composition comprising the poly(arylene sulfide) resin and said at least one nickel compound to the melt viscosity, $\eta^*_0$ measured at a shear rate of 1200/sec of the poly(arylene sulfide) resin is within a range of 0.5–1.6, wherein the melt viscosities are measured by means of a capillary having an internal diameter of 1 mm and an L/D of 10/1 after preheating their corresponding samples for 5 minutes at a temperature of 310° C.

* * * * *